United States Patent [19]
Furukawa et al.

[11] 3,942,862
[45] Mar. 9, 1976

[54] IMAGE STABILIZING OPTICAL SYSTEM HAVING A VARIABLE PRISM

[75] Inventors: Hiroshi Furukawa, Tokyo; Akira Tajima, Kawasaki, both of Japan

[73] Assignee: Canon Kabushiki Kaisha, Tokyo, Japan

[22] Filed: Feb. 14, 1974

[21] Appl. No.: 442,605

Related U.S. Application Data

[63] Continuation-in-part of Ser. No. 405,631, Oct. 11, 1973, abandoned, which is a continuation of Ser. No. 209,619, Dec. 20, 1971, abandoned.

[30] Foreign Application Priority Data
Dec. 28, 1970 Japan............................. 45-128422

[52] U.S. Cl.................................. 350/16; 356/248
[51] Int. Cl.².......................................... G02B 23/00
[58] Field of Search......... 350/16; 354/70; 356/248, 356/250

[56] References Cited
UNITED STATES PATENTS

| | | | |
|---|---|---|---|
| 2,959,088 | 11/1960 | Rantsch | 350/16 X |
| 3,378,326 | 4/1968 | Alvarez | 350/16 |
| 3,475,074 | 10/1969 | Humphrey | 350/16 |
| 3,531,176 | 9/1970 | Humphrey | 350/16 |
| 3,582,179 | 6/1971 | Nakazawa | 350/16 |

FOREIGN PATENTS OR APPLICATIONS
1,181,540   11/1964   Germany............................. 350/16

*Primary Examiner*—David H. Rubin
*Attorney, Agent, or Firm*—Toren, McGeady and Stanger

[57] ABSTRACT

An image stabilized system comprising an afocal telescopic system section, deflecting means and a relay lens system section arranged in this order from the front, said deflecting means including a plano-convex and a plano-concave lens mounted in mating rotatable relation to each other, one of which is fixedly secured to the instrument housing containing the optical system in coaxial alignment with said telescopic system and relay lens system, and the other is held in fixed spatial alignment with the original line of a sight axis by means of a gyro stabilizer coupled thereto, thereby provide for stabilization of an image at the focal plane against accidental angular displacement or motions of the instrument relative to the original line of sight axis.

9 Claims, 9 Drawing Figures

IMAGE STABILIZING OPTICAL SYSTEM HAVING A VARIABLE PRISM

REFERENCE TO RELATED PATENT APPLICATIONS

This application is a continuation-in-part of our copending application, Ser. No. 405,631 filed Oct. 11, 1973 now abandoned, which, in turn, was a continuation of application Ser. No. 209,619, filed Dec. 20, 1971, now abandoned.

BACKGROUND OF THE INVENTION

This invention relates to image stabilizing systems which provide for stabilization of an image in optical instruments irrespective of angular deviations of the instruments from the intended line of sight.

There have been already developed certain stabilized optical systems which employ optical wedges to deflect the line of sight light rays through refracting angles so as to stabilize the images against deviation of the optical systems at an angle from an original direction of alignment with the line of sight. In most of such systems, the optical wedge is arranged so as to establish the relationship between the refracting angle, $\alpha$, and the angle of deviation, $\delta$, that $\delta = (N-1)\alpha$, wherein $N$ is the index of refraction of the optical wedge. In order to reduce the formula to $\delta = \alpha$, transparent materials having an index of refraction of two, $N = 2$, should be selected for employment in the optical wedge. However, it is difficult to obtain such a high index of refraction in actual practice, and the drawback is that some optical properties of high index materials are unfavorable for the lens design. Accordingly, in actual practice the stabilizing optical wedge is formed as a plurality of optical wedges made from low index materials, or otherwise an additional compensation for the remaining image movement should be made by application of external force to the instrument containing the stabilized optical system.

SUMMARY OF THE INVENTION

An object of the present invention is to provide an image stabilizing lens system of which the lens components are made from commercially available low index materials. The use of readily available materials is of great advantage in reducing the cost of manufacturing the optical instruments with the system of the invention therein. Transparent materials having indices of refraction higher than those of the readily available glasses have disadvantages such as being considerably stained. Thus it is desired to avoid the selection of such high index materials for employment in any of the lens components.

Another object of the present invention is to provide an image stabilizing lens system which is marked in the reduction of complexity of the mechanical structure of the instrument containing the lens system. This means that the complete stabilization of an image against accidental deviations of the instrument from the intended line of sight axis is effected by the use of only one optical wedge incorporated in the system without the necessity of applying to the instrument an external force for the compensation of remaining image movement.

Still another object of the present invention is to provide an image stabilizing system which is of compact and of practical use so as to be adapted for use as an attachment of a cine camera and the like. This advantage is derived from the minimization of the movable component constituting a part of the variable deflecting means.

A further object of the present invention is to provide an image stabilizing lens system adapted to compensate for jiggle or oscillations of image in a range of high frequencies.

An additional object of the present invention is to provide an image stabilizing lens system which is marked in the reduction of difficulty of the telescopic system section and the deflecting means are arranged in optionally spaced relationship relative to each other.

The basic construction of the invention is characterized by:

1. All of the lens components except the stabilized lens element of the deflecting means are fixedly secured as a unit to the housing.
2. The above-mentioned lens element is maintained in a fixed spatial direction by a stabilizer such a gyro.
3. The deflecting means consists of, for example, a plano-convex and a plano-concave lens disposed with their curved faces in mating rotatable relationship to each other, wherein the radius of curvature of the convex surface is almost equal to that of the concave surface.
4. The center about which the lens element is rotatable coincides with the center of curvature of the lens element.
5. A relationship between the index of refraction, N, of the transparent material employed in the deflecting means and the angular magnification power, M, of the overall afocal telescopic system is established that $$M = \pm (N - N')$$

wherein N' is the index of refraction of the medium.

DESCRIPTION OF THE PREFERRED EMBODIMENTS

Figure 1:
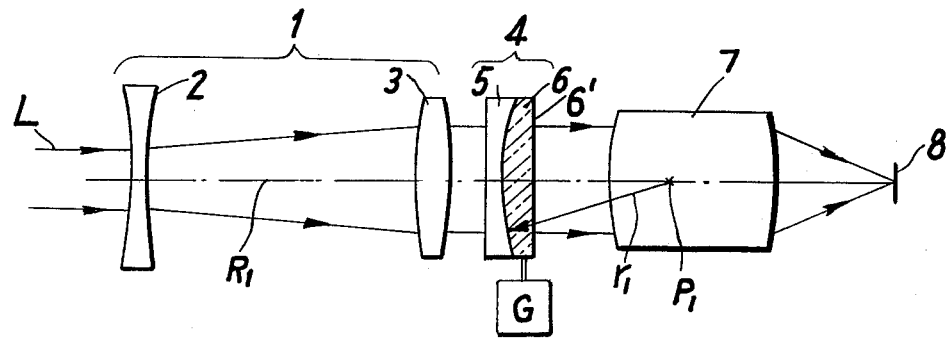
FIG. 1 is a schematic illustration in sectional view of a stabilized optical system in accordance with the present invention.
Figure 2:
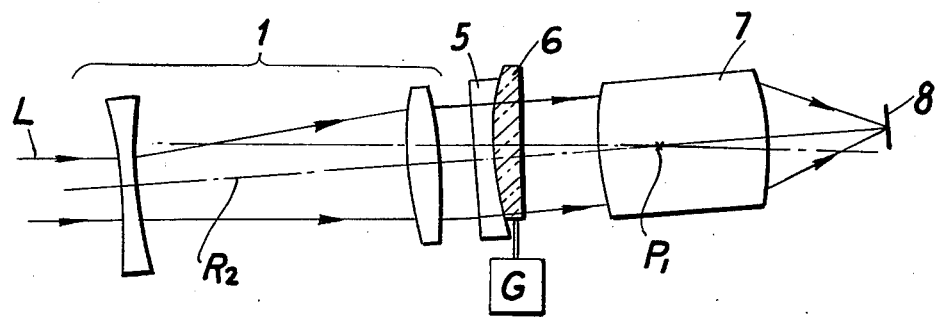
FIG. 2 is a schematic illustration in sectional view of the stabilized optical system of the FIG. 1, and with the system deviated from an original line of sight.
Figure 3:
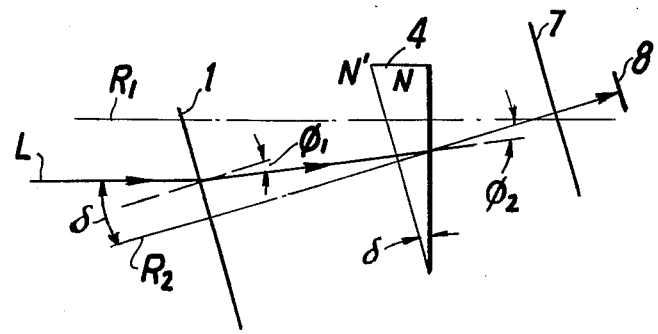
FIG. 3 diagrammatically illustrates the accidental motion compensating action of the optical system of FIGS. 1 and 2 to explain the principle of the invention in terms of geometrical optics.

The invention in one of its aspects is illustrated in FIGS. 1, 2 and 3, wherein an image stabilized system is shown as comprising an afocal front inverted Galileian telescopic system section 1 including a front concave lens element 2 and a rearmost convex lens element 3, a deflecting means 4 in the form of a compound lens consisting of a plano-concave 5 and a plano-convex lens 6 disposed in mating rotatable relation to each other, and a relay lens system section 7. Reference character L designates an axial ray coming from a stationary object. Reference characters $r_1$ and $P_1$ designate respectively the radius and center of curvature of the mating lenses 5 and 6. Reference character $R_1$ designates an optical axis of the system which is in alignment with an original line of sight. In the present embodiment, the plano-convex lens 6 is supported by means of gimbals not shown so that the center of curvature $P_1$ coincides with the center of the gimbals, and is maintained in fixed spatial orientation by means of a stabilizer G such as a gyroscope coupled thereto and freely suspended in space by the gimbals. The telescopic system 1, and the plano-concave lens 5 are fixedly secured as a unit to the instrument housing not shown in coaxial alignment with the relay lens system 7. Inasmuch as the telescopic system 1 having a deflecting action similar to that of the wide angle lens system is in alignment with the original line of sight, the rays of light emerging from the lens 3 are afocal, and are focused by the relay lens on the focal plane 8. In this original state, the deflecting means 4 functions merely as a glass block so that the rays incident upon it pass therethrough without deflection.

With the stabilized optical system as just described, activation of the gyro causes the plano-convex rear lens coupled thereto in the deflecting means to be held in fixed spatial alignment with the original line of sight. When the entire optical system is tilted about the point $P_1$ to an angle of δ with respect to the original line of sight as shown in FIG. 2, the telescopic system 1, the plano-concave lens 5 and the relay lens 7 are deviated from the optical axis of the lens 6, thereupon the mating lenses 5 and 6 generate a socalled optical wedge having a refracting angle, δ, by which the rays are deflected in passing therethrough. Therefore, the line of sight light rays L is deflected by the telescopic system 1 through a deflection angle dependent upon the angular magnification power, M, and then by the deflecting means through an additional deflection angle, thereby the two deflection angles add up to the deviation angle of the instrument from the original line of sight, so that the rays are focussed at the same point on the focal plane 8 as that for which the rays were focussed when the optical instrument was aligned with the original line of sight.

The foregoing will be better understood upon reference to FIG. 3 in terms of geometrical optics. Reference character $R_2$ designates the optical axis of the stabilized system as deviated from the direction of sight $R_1$ at an angle, δ, equal to the refracting angle of the deflecting means. The angle of exit rays, $\phi_1$, from the telescopic system 1 with respect to the axis $R_2$ is given by equation (1)

$$\phi_1 = M \delta \quad (1)$$

(wherein M is the angular magnification power of the telescopic system).

On the other hand, the angle of deviation of the exit rays, $\phi_2$, from the deflecting means with respect to the incident rays is given by equation (2)

$$\phi_2 \doteq \delta(N - N')$$
$$= \delta(N - 1) \text{ in air} \quad (2)$$

(wherein $N'$ is the index of refraction of the medium in which the deflecting means is placed).

If $\phi_1 = \phi_2$, then the direction of the exit rays from the deflecting means 4 is parallel to the axis $R_2$, or the image movement of the focal plane is not effected. The condition for stabilization of an image against angular deviation of the instrument from the original line of sight is derived from equations (1) and (2).

$$M = (N - 1) \quad (3)$$

In asmuch as the condition is satisfied, accidental angular displacement of an optical instrument can be exactly compensated for to provide stationary images by incorporation of the image stabilizing lens system in accordance with the invention therein comprising the afocal inverted Galileian telescopic system section having an angular magnification power, M, and a deflecting means having an index of refraction, N.

Figure 4:
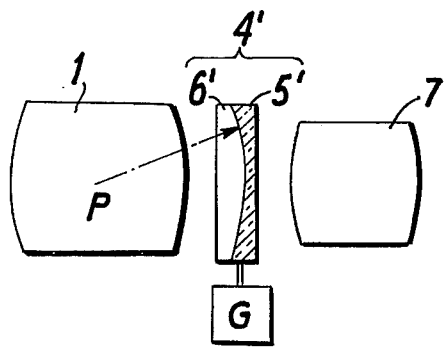
FIG. 4 is a schematic illustration in sectional view of another embodiment of the image stabilized lens system in accordance with the invention.

According to another embodiment depicted in FIG. 4, whilst an afocal inverted Galileian telescopic system 1 and a relay lens system of the same construction as that shown in FIG. 1 are provided, a deflecting means 4' incorporated therein is illustrated as consisting of a planoconvex lens 6' and a plano-concave lens 5' arranged in this order from the front in mating rotatable relationship to each other, the plano-concave lens 5' being held in fixed spatial alignment with the original line of sight by means of a stabilizer G coupled thereto. The reference character P designates the support point of the lens 5', about which the entire stabilized lens system is rotatable. From the foregoing, it will be appreciated that when the instrument housing with the lens system therein is tilted with respect to the original line of sight, the deflecting means 4' generates an optical wedge by which the incoming rays of light are deflected in passing therethrough to provide stationary optical images despite the angular displacement of the instrument therefrom.

Figure 5:
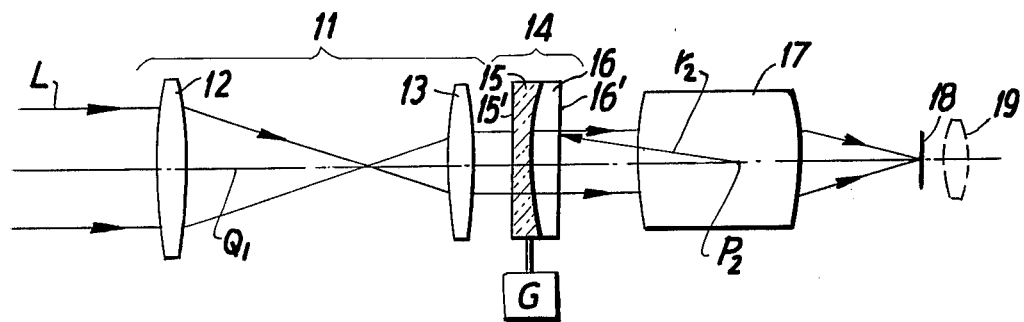
FIG. 5 is a schematic illustration in sectional view of still another embodiment of the stabilized lens system in accordance with the invention.
Figure 6:
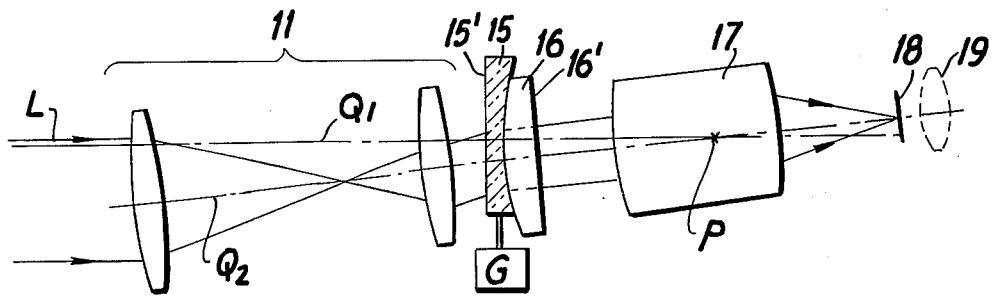
FIG. 6 is a schematic illustration in sectional view of the stabilized lens system of FIG. 5, and with the system deviated from an original line of sight.
Figure 7:
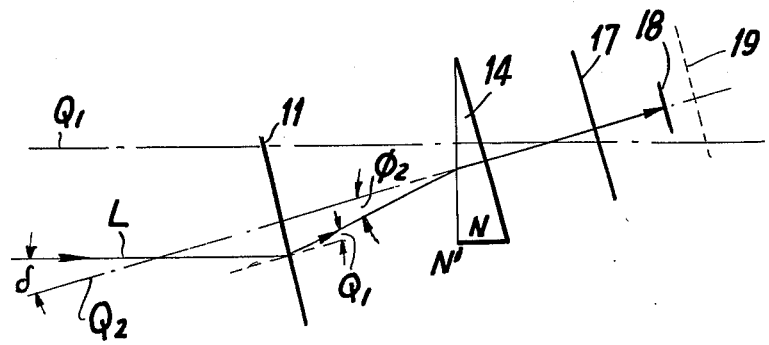
FIG. 7 diagrammatically illustrates the motion compensating action of the stabilized lens system shown in FIGS. 5 and 6.

Another aspect of the invention is illustrated in FIGS. 5, 6 and 7, wherein the stabilized optics of the present invention is applied to a field glass as comprising a Keplerian telescopic system 11 section 11, including a front double convex lens 12 and a rearmost double concave lens 13 a deflecting means 14 in the form of a compound lens consisting of a plano-concave lens 15 defined by a front plain surface 15' and a rearward concave surface with a radius of curvature $r_2$, and a plano-convex lens 16 with a rear plain surface 16', a relay lens system section 17, a focal plane 18, and an eyepiece 19. The plano-concave lens 15 and planoconvex lens 16 are disposed with their curved faces in mating rotatable relationship to each other, and one of the lenses, in this instance the plano-concave lens 15 is held in fixed spatial alignment with an original line of sight axis $Q_2$ by means of a stabilizer G such as gyroscope coupled thereto and freely suspended in space by gimbals not shown, the center of which is placed at the center of curvature $P_2$ of the mating lenses 14. The other lens, i.e. plano-convex lens 16, the telescopic assembly 11, and the relay lens 17, and, if necessary, the eyepiece 19 are fixedly secured as a unit to the instrument housing in coaxial relation. In this arrangement illustrated in FIG. 5, the exit rays from the telescopic assembly 11 is afocal which are focused by the relay lens on the focal plane 18 to provide an erected image. It is to be noted that the stabilized optics is applicable to a cine camera with the film gate positioned at the focal plane 18, but it is necessary to reverse the processed film strip when printing. In this regard, the image stabilizing system in accordance with the present embodiment is suitable for use with field glasses and other optical instruments where an image field of view is involved.

With the stabilized optical system of the field glass, as just described, activation of the stabilizer G causes the front lens of the mating lenses defining the deflecting means to be held in fixed spatial alignment with the original line of sight axis. When the housing is tilted about the center $P_2$ at an angle with respect to the original line of sight axis $Q_1$, the optical axis of the telescopic assembly 11, lens 16, relay lens 17 and eyepiece 19 is oriented at the same angle with respect to the axis $Q_1$, thereupon the mating lenses 14 generate an optical wedge defined by the plain surfaces 15' and 16' having an angle equal to the deviation of the housing with respect to the axis $Q_1$. In order to stabilize the image produced in the observer's field of view despite of the angular deviation of the housing from the original line of sight, the deflection angle through which the exit rays from the telescopic assembly are deflected in passing the generated optical wedge is required to cancel the deflection angle of the telescopic system 11.

The foregoing will be better understood in terms of geometrical optics upon reference to FIG. 7, wherein the optical system with the optical axis $Q_2$ is diagrammatically illustrated as being deviated at an angle, $\delta$, from the original line of sight axis $Q_1$. In this case, the angle of exit rays, $\phi_1$, from the telescopic assembly with respect to the optical axis $Q_2$ is given by the equation (4)

$$-\phi_1 = M \delta \qquad (4)$$

(wherein $M$ is the angular magnification power of the telescopic system 11).

On the other hand, the deflection angle, $\phi_2$, of the deflecting means is given by the equation (5)

$$\phi_2 = \delta (N - N')$$

$$= \delta (N - 1) \text{ in air} \qquad (5)$$

If $\phi_1 = \phi_2$, then the image is stabilized, so that from equations (4) and (5), the general equation for the relationship between the angular magnification power, $M$, of the telescopic system and the index of refraction, $N$, of the deflecting means required to stabilize an image against the deviation of the optical system from the intended line of sight is given by equation (6)

$$M = -(N-1) \qquad (6)$$

Figure 8:
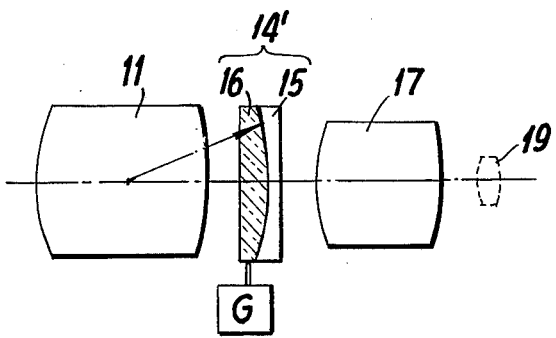
FIG. 8 is a schematic illustration of a further embodiment of the stabilized lens system in accordance with the invention.

According to another embodiment shown in FIG. 8, the reflecting means 14' consists of a front plano-convex lens 16 and a rear plano-concave lens 15 disposed in this order from the front in mating rotatable relationship to each other, the front plano-convex lens 16 being stabilized by means of a stabilizer G coupled thereto, while a Keplerian telescopic system section 11, a relay lens system section 17 and an eyepiece 19 are arranged to effect the same accidental motion compensation as that explained in connection with FIG. 7.

Figure 9:
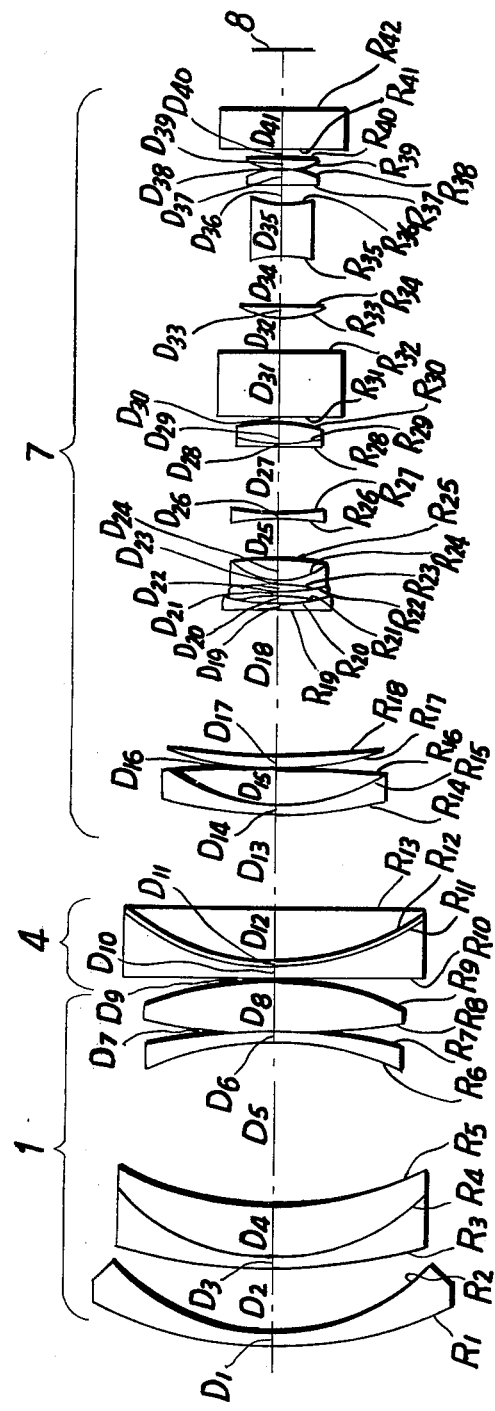
FIG. 9 is one example of a practical embodiment of the stabilized lens system shown in FIG. 1.

FIG. 9 illustrates one example of a practical embodiment of the stabilized lens system shown in FIG. 1. The inversion of only the deflecting means indicated at 4 makes the lens system equivalent to that shown in FIG. 4. The stabilized lens system shown in FIG. 9 may be constructed in accordance with the numerical data given in the following table wherein the symbols have the following meaning: R: Radii of curvature of the successive refracting surfaces. D: Axial thickness of the successive lens elements, or air spaces. N: Refractive indices for $d$ line of spectrum of glasses of the successive lens elements. V: Abbe numbers of glasses of the successive lens elements.

| | R | D | N | V |
|---|---|---|---|---|
| 1 | 11.156 | 0.359 | 1.6779 | 55.3 |
| 2 | 5.689 | 1.759 | | |
| 3 | 16.869 | 0.287 | 1.62299 | 58.2 |
| 4 | 6.049 | 1.340 | 1.76182 | 26.6 |
| 5 | 9.291 | 4.333 | | |
| 6 | −9.680 | 0.316 | 1.76182 | 26.6 |
| 7 | −18.921 | 0.024 | | |
| 8 | 32.203 | 1.320 | 1.60311 | 60.7 |
| 9 | −8.811 | 0.080 | | |
| 10 | ∞ | 0.319 | 1.64 | 60.2 |
| 11 | 7.145 | 0.025 | | |
| 12 | 7.161 | 1.514 | 1.64 | 60.2 |
| 13 | ∞ | 2.550 | | |
| 14 | 14.810 | 0.191 | 1.71736 | 29.5 |
| 15 | 5.050 | 1.004 | 1.6935 | 53.3 |
| 16 | −61.185 | 0.016 | | |
| 17 | 9.650 | 0.319 | 1.62374 | 46.9 |
| 18 | 22.518 | 0.210–5.578 | | |
| 19 | ∞ | 0.115 | 1.63854 | 55.4 |
| 20 | 5.334 | 0.167 | | |
| 21 | ∞ | 0.115 | 1.63854 | 55.4 |
| 22 | 5.928 | 0.271 | | |
| 23 | −5.928 | 0.076 | 1.67 | 51.6 |
| 24 | 1.900 | 0.545 | 1.6727 | 32.1 |
| 25 | −25.296 | 5.689–0.348 | | |
| 26 | −8.830 | 0.127 | 1.56833 | 56.2 |
| 27 | 27.619 | 0.782 | | |
| 28 | 8.599 | 0.096 | 1.76182 | 26.6 |
| 29 | 4.575 | 0.590 | 1.64 | 60.2 |
| 30 | −7.247 | 0.159 | | |
| 31 | ∞ | 1.753 | 1.63854 | 55.4 |
| 32 | ∞ | 0.877 | | |
| 33 | 2.994 | 0.319 | 1.7859 | 44.2 |
| 34 | 36.797 | 1.222 | | |
| 35 | −3.229 | 1.484 | 1.80518 | 25.4 |
| 36 | 3.229 | 0.449 | | |
| 37 | 29.200 | 0.387 | 1.691 | 54.8 |
| 38 | −2.725 | 0.037 | | |
| 39 | 3.363 | 0.311 | 1.67 | 57.4 |
| 40 | −25.568 | 0.229 | | |
| 41 | ∞ | 1.084 | 1.63854 | 55.4 |
| 42 | ∞ | | | |

What is claimed is:

1. An image stabilizing lens system for an optical instrument with an image forming lens system therein comprising an afocal telescopic system section and a deflecting means arranged in this order from the front in front of said image forming lens system, said deflecting means having an entrance flat surface and an exit flat surface, one of said flat surfaces being stabilized by coupling a portion of said deflecting means with a stabilizer for maintaining said flat surface in fixed spatial alignment with an original line-of-sight of said optical instrument despite accidental motion of said instrument, the other of said flat surfaces being fixed to said optical instrument along the optical axis of the instrument, said deflecting means having a refractive index of less than 2, and, by defining the difference between the position of the optical axis of said instrument and the optical line-of-sight of said optical instrument created by an accidental motion as the value $\delta$, said entrance and exit flat surface of said deflecting means for being oriented as a result of instrument motion so that a cross angle is formed by said entrance flat surface and said exit flat surface so as to refract a ray of light to the extent of the refracting angle $\delta (N - N')$, said afocal telescopic system having an angular magnification M and a plus symbol is indicated when an erecting afocal telescopic system is used while a minus symbol is indicated at the employment of an inverting system to said afocal telescopic system, said afocal telescopic system satisfies the equation: $M = \pm(N - N')$ wherein $N$ is the index of refraction of said deflecting means, wherein $N'$ is the index of refraction of a medium in which the entire lens system is placed, wherein an angle formed by a ray of light emitted from the afocal telescopic system and the optical axis thereof is equal to the refracting angle of said deflecting means when said entire system is in said medium, and wherein the ray of light emitted from the deflecting means is always parallel with the optical axis.

2. An image stabilizing lens system as described in claim 1, wherein said deflecting means is constructed in the form of a compound lens including a plano-concave lens and a plano-convex lens, said two lenses having almost equal radii of curvature of the concave and convex surfaces to each other, and being disposed with their faces in mating rotatable relationship to each other and the center of rotation is substantially coincident with the center of curvature of the plano-convex lens.

3. An image stabilizing lens system as described in claim 2, wherein said afocal telescopic system is an afocal inverted Galileian telescopic system having an angular magnification power of $M - (N - 1)$, wherein $N$ is the index of refraction of said compound lens composing said deflecting means positioned after said afocal telescopic system.

4. An image stabilizing lens system as described in claim 3, wherein said compound lens includes a front plano-concave lens and a rear plano-convex lens, said plano-convex lens being held in fixed spatial alignment with the original line of sight by means of the stabilizer coupled thereto.

5. An image stabilizing lens system as described in claim 3, wherein said compound lens includes a front plano-convex lens and rear plano-concave lens, said plano-concave lens being held in fixed spatial alignment with the original line of sight by means of the stabilizer coupled thereto.

6. An image stabilizing lens system as described in claim 2, wherein said afocal telescopic system is an afocal Keplerian telescopic system having an angular magnification power of $M = -(N - 1)$, wherein $N$ is the index of refraction of said compound lens composing said deflecting means positioned after said afocal telescopic system.

7. An image stabilizing lens system as described in claim 6, wherein said compound lens includes a front plano-concave lens and a rear plano-convex lens, said plano-concave lens being being held in fixed spatial alignment with the original line of sight by means of the stabilizer coupled thereto.

8. An image stabilizing lens system as described in claim 6, wherein said compound lens includes a front plano-convex lens and a rear plano-concave lens, said plano-convex lens being held in fixed spatial alignment with the original line of sight by means of the stabilizer coupled thereto.

9. An image stabilizing lens system as described in claim 6, wherein said image forming relay lens system includes an eyepiece.

* * * * *